(12) United States Patent
Mengibar et al.

(10) Patent No.: US 9,286,892 B2
(45) Date of Patent: Mar. 15, 2016

(54) LANGUAGE MODELING IN SPEECH RECOGNITION

(71) Applicant: Google Inc., Mountain View, CA (US)

(72) Inventors: Pedro J. Moreno Mengibar, Jersey City, NJ (US); Mark Edward Epstein, Katonah, NY (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 14/242,228

(22) Filed: Apr. 1, 2014

(65) Prior Publication Data

US 2015/0279360 A1   Oct. 1, 2015

(51) Int. Cl.
*G10L 15/18* (2013.01)
*G10L 15/06* (2013.01)
*G06F 17/27* (2006.01)

(52) U.S. Cl.
CPC ............ *G10L 15/18* (2013.01); *G06F 17/2705* (2013.01); *G10L 15/063* (2013.01)

(58) Field of Classification Search
USPC ................................................. 704/243, 257
See application file for complete search history.

(56) References Cited

U.S. PATENT DOCUMENTS

| | | | |
|---|---|---|---|
| 6,157,912 A | 12/2000 | Klakow et al. | |
| 6,973,427 B2 * | 12/2005 | Hwang et al. | 704/249 |
| 7,031,908 B1 | 4/2006 | Huang et al. | |
| 7,035,788 B1 | 4/2006 | Nakajima et al. | |
| 7,584,102 B2 | 9/2009 | Hwang et al. | |
| 8,447,608 B1 * | 5/2013 | Chang et al. | 704/257 |
| 8,515,734 B2 | 8/2013 | Shu et al. | |
| 8,615,389 B1 | 12/2013 | Marcu | |
| 2005/0055209 A1 | 3/2005 | Epstein et al. | |
| 2005/0203728 A1 | 9/2005 | Wang | |
| 2006/0041427 A1 * | 2/2006 | Yegnanarayanan et al. | 704/235 |
| 2006/0074656 A1 * | 4/2006 | Mathias et al. | 704/243 |
| 2006/0074667 A1 * | 4/2006 | Saffer | 704/257 |
| 2007/0100618 A1 | 5/2007 | Lee et al. | |
| 2012/0191449 A1 * | 7/2012 | Lloyd et al. | 704/231 |
| 2012/0232885 A1 * | 9/2012 | Barbosa et al. | 704/9 |
| 2013/0013311 A1 | 1/2013 | Zheng | |

FOREIGN PATENT DOCUMENTS

| | | |
|---|---|---|
| WO | 2004/068271 | 8/2004 |
| WO | 2012/027095 | 3/2012 |

OTHER PUBLICATIONS

'Wikipedia' [online]. "Language model," Feb. 21, 2014 [retrieved on Apr. 1, 2014]. Retrieved from the Internet: URL<http://en.wikipedia.org/wiki/Language_model>, 3 pages.

* cited by examiner

*Primary Examiner* — Abul Azad
(74) *Attorney, Agent, or Firm* — Fish & Richardson P.C.

(57) ABSTRACT

Some implementations include a computer-implemented method. The method can include providing a training set of text samples to a semantic parser that associates text samples with actions. The method can include obtaining, for each of one or more of the text samples of the training set, data that indicates one or more domains that the semantic parser has associated with the text sample. For each of one or more domains, a subset of the text samples of the training set can be generated that the semantic parser has associated with the domain. Using the subset of text samples associated with the domain, a language model can be generated for one or more of the domain. Speech recognition can be performed on an utterance using the one or more language models that are generated for the one or more of the domains.

21 Claims, 6 Drawing Sheets

LANGUAGE MODELING IN SPEECH RECOGNITION

TECHNICAL FIELD

This document generally relates to speech recognition.

BACKGROUND

Speech recognition has become a widely adopted and frequently used mode of interacting with computing devices. Speech input may be more convenient and efficient than traditional input modes such as typing through a keyboard. For example, mobile computing devices may offer speech recognition services as an alternative input mode to typing characters through a virtual keyboard on a touchscreen. Some computing devices are configured to accept voice commands from a user as a shortcut to performing certain actions on the computing device. Voice commands and other speech can be transcribed to text using language models. Language models have been trained using samples of text in a language to improve accuracies of the language models.

SUMMARY

This document generally describes techniques for training language models for use in speech recognition. Special language models, which may be configured to transcribe representations of spoken input into text, can be generated specifically for particular action(s) or other domain(s) associated with a special language model. For example, a special language model can be trained using only or primarily only text samples that have been determined to be associated with a particular action. In some implementations, a plurality of text samples can be sorted into groups of text samples based on the action associated with the text sample. These groups of text samples can be used by a language modeling engine to generate multiple special language models. In some examples, a semantic parser is used to determine the association between a text sample and an action. The special language models may then be used in speech recognition to improve the accuracy of transcribing an utterance. These techniques may bridge the functions of language models and semantic parsers so that speech recognition systems can use each to more accurately perform speech recognition.

In some implementations, a computer-implemented method includes providing a training set of text samples to a semantic parser that associates text samples with actions. The method can include obtaining, for each of one or more of the text samples of the training set, data that indicates one or more actions that the semantic parser has associated with the text sample. For each of one or more actions, a subset of the text samples of the training set can be generated that the semantic parser has associated with the action. Using the subset of text samples associated with the action, a language model can be generated for one or more of the actions. Speech recognition can be performed on an utterance using the one or more language models that are generated for the one or more of the actions.

In some implementations, a computer-implemented method is provided. The method can include providing a training set of text samples to a semantic parser that associates text samples with domains and obtaining data that indicates associations determined by the semantic parser between at least some of the text samples of the training set and one or more domains. The method can include generating a first subset of text samples that the semantic parser has associated with a first of the one or more domains. The method can include generating a first language model for the first of the one or more domains using the first subset of text samples that the semantic parser has associated with the first of the one or more domains. The method can include performing speech recognition on an utterance using the first language model for the first of the one or more domains.

These and other implementations can include one or more of the following features. The text samples in the training set can be identified from at least one of records of past search queries, web pages, books, periodicals, and other electronic documents.

At least some of the text samples in the training set can be identified from records of past utterances spoken by a population of users.

Performing speech recognition on the utterance can further include using, along with the first language model for the first of the one or more domains, a general language model that is not associated with particular domains.

The method can further include generating a second subset of text samples that the semantic parser has associated with a second of the one or more domains, and generating a second language model for the second of the one or more domains using the second subset of text samples that the semantic parser has associated with the second of the one or more domains.

Performing speech recognition on the utterance can further include using the second language model for the second of the one or more domains.

Performing speech recognition on the utterance can include obtaining a first transcription of the utterance from the first language model and a second transcription of the utterance from the second language model; obtaining respective scores for the first transcription and the second transcription that indicate respective likelihoods that the first transcription or the second transcription accurately reflects the utterance; and selecting the first transcription or the second transcription to provide to a user based at least on the respective scores for the first transcription and the second transcription.

The method can further include identifying context information associated with the utterance, and using the context information to bias the respective scores for the transcriptions.

Using the context information to bias the respective scores for the transcriptions can include determining whether the context information is consistent with the first of the one or more domains or the second of the one or more domains.

The method can further include obtaining for particular ones of the text samples of the training set, a confidence score that indicates a confidence of the association between the text sample and the one or more domains that the semantic parser has associated with the text sample.

The method can further include identifying data that indicates user confirmation of the one or more domains that the semantic parser has associated with a particular one of the text samples, and in response, biasing the confidence score for the particular one of the text samples to indicate a greater confidence in the association between the particular one of the text samples and the one or more domains.

Generating the first subset of text samples that the semantic parser has associated with the first of the one or more domains can include excluding text samples from the first subset of the text samples that have confidence scores below a predetermined threshold.

Generating the first language model for the first of the one or more domains can include identifying terms in the text samples that are associated with a class, and performing speech recognition on the utterance using the first language model can include accessing lists of terms associated with the class.

The one or more domains can be one or more actions that a user may request or command to be executed.

In some implementations, one or more computer-readable storage devices are provided that have instructions stored thereon that, when executed by one or more computers, cause the one or more computers to perform operations. The operations can include providing a training set of text samples to a semantic parser that associates text samples with domains; obtaining data that indicates associations determined by the semantic parser between at least some of the text samples of the training set and one or more domains; generating a first subset of text samples that the semantic parser has associated with a first of the one or more domains; generating a first language model for the first of the one or more domains using the first subset of text samples that the semantic parser has associated with the first of the one or more domains; and performing speech recognition on an utterance using the first language model for the first of the one or more domains.

These and other implementations can include one or more of the following features. The text samples in the training set can be identified from at least one of records of past search queries, web pages, books, periodicals, and other electronic documents.

At least some of the text samples in the training set can be identified from records of past utterances spoken by a population of users.

Performing speech recognition on the utterance can further include using, along with the first language model for the first of the one or more domains, a general language model that is not associated with particular domains.

The operations can further include generating a second subset of text samples that the semantic parser has associated with a second of the one or more domains, and generating a second language model for the second of the one or more domains using the second subset of text samples that the semantic parser has associated with the second of the one or more domains.

In some implementations, one or more computers can be configured to provide a repository of training data that includes a plurality of text samples in a natural language; a semantic parser configured to process a set of text samples from the plurality of text samples to determine, for each text sample in the set of text samples, a domain associated with the text sample; a training set manager configured to generate subsets of text samples that correspond to respective domains, wherein each subset of text samples includes text samples that the semantic parser has associated with the domain that corresponds to the subset of text samples; a language modeling engine configured to generate a respective language model for each of the subsets of text samples; and a speech recognizer configured to receive an utterance and to recognize the utterance using one or more of the language models that are generated for each of the subsets of text samples.

The techniques described herein may offer one or more of the following advantages. Special language models can be generated that more accurately transcribe utterances directed to one or more actions that correspond to the respective special language models. The special language models may generate transcriptions of utterances that more closely match language that may be accurately parsed by a semantic parser. Multiple language models can be used to perform speech recognition on an utterance, and a transcription can be selected from the multiple language models that is determined to be the most accurate transcription of the utterance. In some implementations, the output from special language models can be compared to output from an all-purpose language model so that a more accurate transcription can be selected between a special language model and the all-purpose language model.

BRIEF DESCRIPTION OF THE DRAWINGS

Like reference numbers and designation in the various drawings indicate like elements.

DETAILED DESCRIPTION

Figure 1:
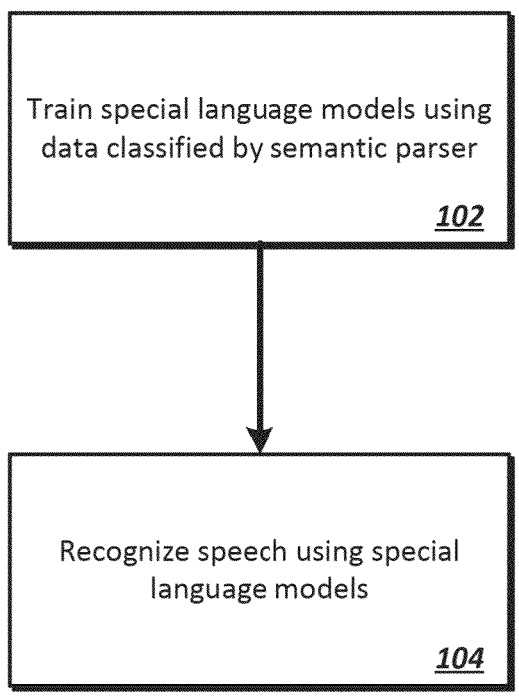
FIG. 1 depicts an example process for training and using special language models.

This document generally relates to techniques for improving language models in speech recognizers. Language models can be used by speech recognition engines to generate sequences of terms, such as phrases or sentences, which are determined to be a likely textual transcription of an utterance or other spoken input in a natural language. For example, if a user speaks, "How do I get to the movie theater by the mall?," the utterance may be processed through a speech recognition engine such that an English language model may determine that an audio element in the utterance corresponding to "get" is most likely the word "get" rather than "jet" because a probability of the words "I get" being spoken in succession is much greater than the probability of "I jet." Language models facilitate resolution of ambiguities in the underlying speech data for an utterance, thereby improving accuracy in the output of a speech recognition engine.

Speech recognition engines may include or work in conjunction with semantic parsers. Semantic parsers can accept textual strings as input, and annotate the strings by identifying terms and phrases in the strings that belong to a particular class. For example, given the sentence "Send an e-mail to Sandy that I am running 5 minutes late," the semantic parser may annotate the sentence as follows: "<action>Send</action> an <message mode>e-mail</message mode> to <recipient>Sandy</recipient> that <subject>I am running 5 minutes late</subject>." The output of the semantic parser can be used, for example, to enable conversational voice commands on a computing device. Thus, when a user speaks the aforementioned sentence to send the e-mail to Sandy, the speech recognition system can use a language model to generate a transcription of the input, and the semantic parser can then process the transcription to determine a command and associated parameters (attributes) for the command. For example, the command (or action) for "send" can be identified by the semantic parser, and then certain parameters that are specifically associated with that action, such as recipient, subject, message body, etc., can be identified. The output of the semantic parser can then be provided to an appropriate application or service that corresponds to one or more actions identified from the transcription, along with the information that indicates the identified parameters. For example, the semantic parser may provide information regarding the annotated transcription of the utterance for sending the e-mail to Sandy to an e-mail application.

This document describes techniques for improving language models by generating special, category-specific language models that are trained with data belonging to one or more categories of data. In some implementations, the categories represent different domains of knowledge, such as different actions that a user may request or command a computing device to perform. In some implementations, the special language models are trained with data that has been grouped into categories based on output from a semantic parser. For example, in order to generate a language model, a language modeling engine can obtain a large amount of text that is written in a particular language corresponding to the language model that is to be generated, and can statistically analyze the text to generate a model of the language. For example, the language model may analyze the content of web pages, query logs, books, and more to determine probabilities that two or more terms are used near each other, or in sequence, in a language. Using the techniques described herein, a large set of training data may be provided to a semantic parser. The semantic parser may then process one or more pieces of data in the set, and categorize the data into different groups based on a determined action or other annotation identified in the data. For example, natural language queries from a search engine, records of voice commands, and other data can be fed to one or more semantic parsers, and then actions associated with each piece of data, or with certain ones of the pieces of data, can be determined. After being associated with one or more actions, the data can be grouped based on actions, and each action-specific group of data may be provided to a language modeling engine to generate respective action-specific language models (i.e., special language models). Accordingly, language models can be generated, for use in a speech recognition system, which are trained on subsets of data directed to particular actions or other categories of data. The special language models may be more accurate in transcribing utterances directed to particular actions corresponding to the respective language models. Moreover, these techniques may bridge the functions of language models and semantic parsers so the special language models produce output that is more likely to be expected, and thus accurately understood, by semantic parsers.

Referring now to FIG. 1, a flowchart is depicted of an example process 100 for training and using special language models. At stage 102, one or more special language models are trained using respective sets of categorized data. In some implementations, the data in the sets may have been categorized based on the output of a semantic parser. At stage 104, the special language models are used during runtime of a computing system or device to perform speech recognition on spoken input. The stages 102 and 104 are described in greater detail below with respect to FIG. 2 and FIG. 3, respectively.

Figure 2:
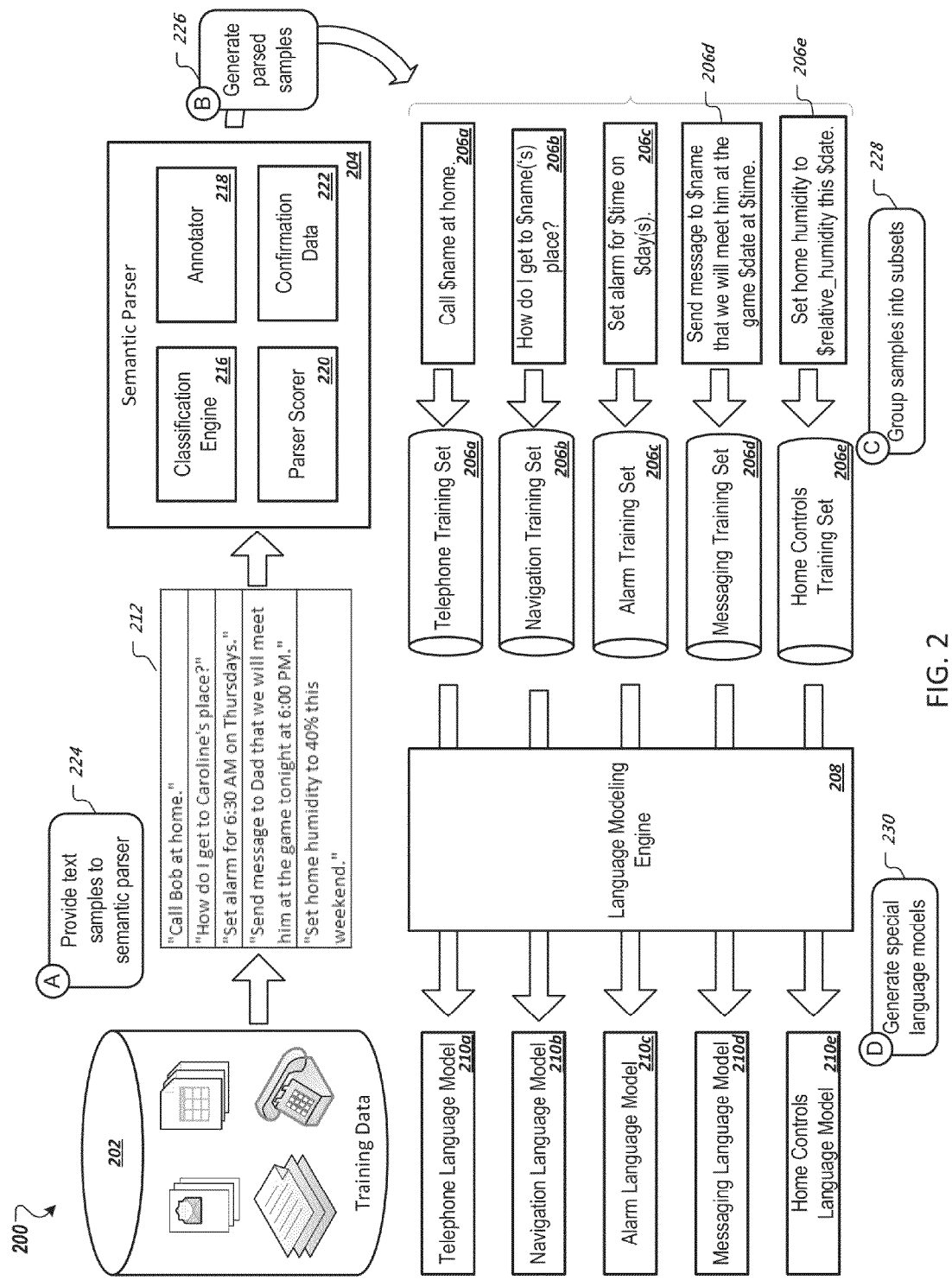
FIG. 2 depicts a schematic diagram of an example system for training and generating special language models.

Referring now to FIG. 2, a schematic diagram is depicted of an example system 200 for training and generating special language models. The system 200 includes one or more corpora of training data 202, semantic parser 204, and language modeling engine 208. Generally, data 212 from corpora 202 are provided to the semantic parser 204. The semantic parser 204 associates one or more pieces of data 212 with a category, such as an action or other domain of knowledge (e.g., actions, restaurants, music, people, movies, etc.), and generates parsed text samples 214a-e. The annotated data is then associated with one or more special training sets (subsets of training samples) 206a-e. Each of the special training sets 206a-e may then be used by the language modeling engine 208 to generate respective special language models 210. The features and processes of the system 200 are described with greater detail in the following paragraphs.

The one or more corpora of training data 202 include multiple samples of text in a natural language. The text samples may be obtained from various sources and may be representative of how words, terms, and the like are used in a language, and/or how sequences of words are constructed and used in a language. For example, large amounts of training data may be obtained by crawling the web and identifying content from web pages, blogs, word processing documents, messages, electronic books, and more.

In some examples, the one or more corpora of training data 202 can include data from records of past queries received by a computing service. For example, a cloud-based speech recognition service may receive voice commands and other spoken input from a plurality of users of the speech recognition service. The speech recognition service may store or otherwise retain information about the received voice commands or other spoken input that can later be used for other purposes, such as training special language models. The information stored or retained may be transcriptions of the voice commands or other spoken input, and metadata that indicates certain information about the transcriptions. For example, information may be retained that indicates whether the transcription was accurate, where such information is available. Thus, in one example, if a user provides a voice query to a search engine, the voice query may be transcribed by the speech recognition service, and the search engine may perform a search on the transcribed query. Metadata may then be retained and associated with the transcribed textual query in the corpora 202 that indicates whether or not the search on the transcribed query was successful. For instance, if the user selected one of the top-ranked search results that was returned in response to the transcribed query, then that may be an indication that the transcription was accurate, which information may be stored in the corpora of training data 202. On the other hand, information that indicates the query or the transcription of the query was not accurate or did not provide satisfactory results may also be retained, such as information indicating that a user did not select any search results provided in response to the query or that the user quickly issued a new or modified query after the unsatisfactory query without selecting a result, or that the user manually revised the transcribed query.

The data in the one or more corpora 202 may include data in one or more languages. When data is included for multiple languages, the data can be grouped according to language so that a language, or multiple languages, are associated with each piece of data in the corpora 202. For example, the one or more corpora 202 may include a respective corpus of training data for each of multiple languages. The data can be associated with a language so that appropriate data is selected for use in training a language model, which may be associated with a particular language. Thus, English training data can be obtained from an English data corpus 202, while Mandarin training data can be obtained from a Mandarin data corpus 202. The language for the training data can be determined or inferred based on the content of the data or using context about a source of the data. For example, a language detection engine (not shown) may analyze the content of the textual elements of data to identify whether the data is English, Mandarin, French, Spanish, or any other language. In some implementations, context about a source of the data is used to infer the language. For example, if a particular piece of data in the corpora 202 represents a transcribed voice query, then a language can be identified based on characteristics of the user who submitted the query, a location of the user when the utterance for the query was sent, or a language associated with the language model that was used to transcribe the query.

Certain steps may be taken to anonymize the training data in the corpora 202 so that the corpora 202 does not include information usable to identify information about users associated with the data. In some implementations, personally identifying information may be purged from data in the corpora 202 so that only the content of data that is needed for training the language models is retained. For example, the corpora 202 may include content of a blog post that was scraped from a website that included a name, e-mail address, and location of a user who posted the blog. The data in the corpora 202 may be completely dissociated with the identifying information from the blog, including information about the user who posted the blog and information about the site from which the blog post was scraped. Only the content of the blog post may be retained in the corpora 202, and any relevant anonymized metadata (e.g., user satisfaction data). In some implementations, the corpora 202 may include textual samples that were generated or accessed in association with activity in a user account. The system 200 may be configured so that a user opts-in or opts-out of having anonymized data analyzed and included in the corpora of training data 202.

At stage A (224), one or more samples of training data 212 are provided from the one or more corpora of training data 202 to the semantic parser 204 to be annotated and/or to be associated with a domain (e.g. action) or other classification. The one or more samples of training data 212 that are provided to the semantic parser 204 may be selected in according to various criteria. For example, all of the samples that are available in the one or more corpora of training data 202 may be selected to be provided to the semantic parser 204, or a subset of all the samples maybe provided to the semantic parser 204. In some limitations, the training data in the corpora 202 are filtered so that only samples 212 meeting particular criteria are provided to the semantic parser 204. For example, only samples 212 that were obtained from a certain demographic of users (e.g., users in a certain geographic region, users within a particular age group, etc.), samples that were obtained from particular sources (e.g., web pages, social media posts, e-mail, blogs, literature, etc.), samples of a particular type (e.g., search queries, voice commands, application-specific commands, etc.) may be selected for training one or more special language models 210. Additionally, only samples that were generated, written, or otherwise associated with certain period of time, such as a recent period of time, may be selected, so that language models 210 can be trained only based on language usage associated with the designated time period. Thus, for example, language models can be trained using samples 212 that reflect the most current usage of a particular language since languages evolve, sometimes quickly within the context of user interaction with computing devices. In some implementations, the samples 212 that will be provided to the semantic parser 204 and used to train one or more special language models 210 may be identified based on a substantially random selection of a subset of data samples. In some implementations, the selected samples 212 may be a pseudo-random selection of samples that is representative of the larger set of samples in the one or more corpora 202. For example, if ⅓ of all of the training data within the corpora 202 were generated by users within a particular demographic, then the selected samples 212 can be selected so as to maintain a substantially proportionate amount of samples for the particular demographic. In some implementations, all or some of the samples 212 of training data can be selected as a result of being associated with user interaction data for the sample 212. For example, one of the selected samples 212 that was a search query may be associated with user interaction data that indicates whether the search query was successful such as whether the user visited a highly ranked search result that was provided in response to the search query. In another example, one of the selected samples 212 may have been a voice command such as "Set alarm for 6:30 am." User interaction data for the voice command may indicate whether the user confirmed some action that was performed in response to the voice command. For instance, if a mobile device set the user's alarm for 6:30 am in response to the voice command, and prompted the user to confirm that he or she would like to set the alarm for this time, and the user so confirmed, this confirmation could be saved with the transcription of the voice command and made available from the one or more corpora 202. The confirmation or other user interaction data can be useful to the semantic parser to confirm that an annotation or classification for a sample of training data is accurate, as described further below.

In the example of FIG. 2, a representative selection of five different samples 212 of textual training data are shown. In this example, each of the five samples are short commands. These commands may have been obtained from one or more sources, including from records of previously transcribed voice commands. For example, each of the representative samples 212 may correspond to a voice command issued by a different respective user to an application or service on a mobile computing device (e.g., smartphone, tablet). The mobile computing device may perform speech recognition on the command locally at the device, or may have sent audio data for the spoken command to a remote server for speech recognition to be performed remotely. In either case, a textual transcription for the voice command may be obtained and stored in the one or more corpora 202. Thus, all or some of the samples 212 shown in FIG. 2 may be transcriptions of voice commands provided that a user has spoken at a computing device.

The semantic parser 204 receives the samples 212 of training data and associates an action or otherwise assigns a classification to all or some of the samples 212. At operation B (226), the semantic parser outputs the processed samples 212 with an associated action or other classification. The semantic parser 204 may include one or more of a classification engine 216, annotator 218, parser scorer 220, and confirmation data repository 222. In some implementations, the semantic parser 204 may receive and process the samples 212 serially, or the samples 212 may be processed in parallel or as a batch. For example, in some implementations, millions or billions of samples 212 may be selected to train the special language models 210, each of which is to be processed by the semantic parser 204. For efficiency, the operations of the semantic parser 204 may be scaled and distributed among multiple machines to process the large quantity of samples 212.

The classification engine 216 analyzes a sample 212 of training data and assigns the sample 212 to one or more classifications. In some implementations, the classifications can be actions or applications associated with voice commands or other voice interaction services. For example, the classification engine 216 can determine an action to which the sample 212 is directed or relates to. Thus, the classification engine 216 can analyze the phrase "Call Bob at home," and determine from the verb "Call" that the sample 212 relates to a command for making a telephone call. The "Call Bob at home" sample can then be associated with a "call" action or a "telephone" classification, for example. Similarly, the text sample 212 "How do I get to Caroline's place" can be associated with a "navigation" action, and the text sample 212 "Set home humidity to 40% this weekend" can be associated with a "humidification" action.

The classification engine 216 can determine an action or other classification associated with a text sample using one or more techniques. In some implementations, the classification engine 216 can apply rules that have been developed using machine learning techniques to determine an appropriate action or other classification. For example, a parser training set of text samples that previously have been associated with respective actions or other classifications can be used to develop rules for the classification engine 216. The text samples in the parser training set may be manually associated with particular actions or other classifications by a user, for example. The manually classified text samples, along with their respective classifications, can be provided to a learning engine (not shown) that determines and refines rules for the classification engine 216. In some implementations, a user may confirm whether a hypothesized action or classification for a text sample that has been determined by the classification engine 216 is correct, and feedback from the user as to the correctness of the hypothesis can be used to further tune or refine the rules. Accordingly, sophisticated classification rules can be determined using machine learning techniques. In some implementations, the classification engine 216 may assign an action or other classification to a text sample based on a determination that the text sample includes one or more words that have been designated as corresponding to one or more actions or other classifications. For example, the text sample 212 "Send message to Dad that we will meet him at the game tonight at 6:00 PM" can be associated with a messaging action since the sentence begins with the terms "Send message."

In some implementations, the classification engine 216 can assign more than one action to a particular text sample 212. In some cases, multiple actions are associated with a single text sample 212 because different actions are explicitly determined for respective portions of the text sample 212. For example, given a text sample that includes two independent clauses such as "Send message to Len that I will meet him at school tomorrow morning, and set reminder to meet Len at school at 8:00 tomorrow morning," the classification engine 216 may bifurcate the text sample and associate the first clause with a messaging action, and the second clause with a tasks or appointment action, for example. In some implementations, the classification engine 216 can assign multiple actions to a text sample if the text sample is ambiguous and there is at least a threshold likelihood that the text sample is properly associated with each of multiple actions. For example, the text sample "Did I remind you to call me yesterday?" may be associated with a tasks or appointment action due to inclusion of "remind" near the beginning of the sentence, but may also be associated with a telephone calling action due to the inclusion of the phrase "to call me yesterday."

The semantic parser 204 may include a pre-defined list of actions or other classifications to associate with particular text samples. The actions in the list may reflect actions that are associated with computing devices that employ a speech recognition service. In some implementations, a mobile computing device may include various services and applications that are capable of performing one or more actions in response to voice commands. For example, an operating system on a smartphone may include one or more of a native telephone application, e-mail client, web browser, contacts manager, calendar application, and social media application. Each of these applications or services may be registered with a voice recognition service on the mobile computing device. The device may listen for spoken input, and perform speech recognition on the spoken input. Upon determining that the spoken input is a voice command associated with one of the registered applications or services, an indication of the voice command can be passed to the appropriate application or service for performance of an identified action. The data may be passed to the registered application or service using an application programming interface ("API") in some examples. In some implementations, the list of actions that are available to the classification engine 216 to associate with text samples 212 is based on actions that have been registered with one or more computing devices by particular applications or services. In some implementations, a single application or service may register multiple actions, which actions may be available to the classification engine 216. For example, an e-mail client application may have actions for composing a new message, forwarding a message, replying to a message, and deleting a message. Thus, the classification engine may associate different actions with different text samples, even when the different actions each are performed by a common application or service.

The parser scorer 220 can assign a confidence score to associations that the classification engine 216 has made between text samples and actions or other classifications for the text samples. The confidence score for a text sample can indicate a likelihood that the text sample is correctly associated with an action. For example, the text sample 212 "Set alarm for 6:30 AM on Thursdays" may be associated with an alarm clock action, and the confidence score for the text sample—action association in this case may be relatively high because the content of the text sample is not vague or ambiguous, and includes context in the content of the text sample that is clearly relevant to setting an alarm clock. For instance, the classification engine 216 may determine that the text sample is associated with an alarm clock action based on the beginning words of the text sample that clearly state the action to be performed: "Set alarm." The parser scorer 220 may thus use the structure of the sentence and the identified form of the action verb in the sentence to determine the confidence score. In some implementations, the confidence score may be further based on additional context from the text sample. The parser scorer 220 may determine whether the additional context from the text sample is consistent with the form of the sentence, action verb in the sentence, or the action that has been determined by the classification engine 216. For example, the classification engine 216 may have determined that the text sample "Set alarm for 6:30 AM on Thursdays" corresponds to the alarm clock action. Because the text sample includes additional terms, such as a time (6:30 AM) and day of the week (Thursdays), that are consistent with the alarm clock action, a relatively high confidence score can be determined for the association between the text sample and the action. In another example, the classification engine 216 may determine that the text sample "Where did I set the alarm clock last night?" is most closely associated with an alarm clock action. However, the parser scorer may 220 may determine a relatively low confidence score for the association between the text sample and the alarm clock action in this case. The low confidence score may be based on various factors, for example, that the sentence is not structured as a command, the adverb "where" is not generally used in a command for setting an alarm clock, and the only time or date in the text sample—"last night"—is a past time rather than some time in the future for which an alarm may be set. In some implementations, the parser scorer 220 may generate confidence scores based on how well one or more features of a text sample align with other text samples that have been previously confirmed to be associated with particular actions. For example, if many text samples having structures and terms similar to that in the text sample "Set alarm for 6:30 AM on Thursdays" have previously been correctly associated with the alarm clock action, then the parser scorer 220 may determine a high confidence in the association between the text sample and the alarm clock action.

In some implementations, the parser scorer 220 may use information from confirmation data repository 222 to determine confidence scores for associations between text samples and actions. The confirmation data repository 222 may include information that indicates whether particular text samples processed by the semantic parser 204 are verified as being associated with one or more actions. For example, a text sample that has been obtained from a transcription of the voice command, "Send message to Dad that we will meet him at the game tonight at 6:00 PM," may be associated with confirmation data that indicates user satisfaction with an action that was performed in response to the voice command. For instance, the computing device may have composed a text message to "Dad" in response to the "send message" command. Upon generating the text message, the computing device may prompt the user to confirm whether the message has been generated correctly and whether to send the message. If the message is confirmed, then confirmation data can be generated verifying that the voice command was correctly transcribed and that the messaging action was properly selected in response to the command. The confirmation data 222 can then be obtained by the semantic parser 204 and used by the parser scorer 204 to determine a confidence of an action that the classification engine 216 has associated with a text sample. For example, the parser scorer 220 can compare an action indicated by the confirmation data 222 with the action identified by the classification engine 216 to influence the confidence score for a text sample. Thus, if the confirmation data for a particular text sample verifies that the user confirmed a particular action to be performed in response to a voice command, then the confidence score may be skewed higher if the action associated with the particular text sample by the classification engine 216 matches the particular action from the confirmation data 222. Likewise, if there is a mismatch between the action identified by classification engine 216 and the action verified by confirmation data 222, then the confidence score for a text sample 212 may be skewed lower.

The semantic parser 204 can also include an annotation engine 218 (annotator). The annotation engine 218 can label portions of a text sample with attributes associated with an action for the text sample. An attribute is a parameter associated with an action that is usable by a computing device to perform the action. Different sets of attributes may correspond to different actions. For example, a messaging action may have attributes such as messaging modality (e.g., microblogger, private chat, SMS, e-mail), message recipients, subject line, message body, signature line, etc. A media action that plays a media file may have different attributes such as ones that identify the media file to be played, a volume level for playing the media file, an option to play audio with or without video, and other parameters relevant to playing a media file. Generally, annotation engine 218 is configured to parse text samples so as to identify important pieces of information from the text samples. The annotation engine 218 thus facilitates processing natural language voice commands that may be unstructured so that a computing device can perform a specified action according to the parameters indicated in the voice command. Users are therefore not limited to interacting with their computing devices in a constrained, structured manner, but can instead provide spoken input in a conversational manner that may be understood by the computing devices.

In some implementations, the classification engine 216 may be included within the annotation engine 218. For example, the classification engine 216 may identify an action that is associated with a text sample by labeling a portion of the text sample (e.g., an action verb) that indicates the action for the text sample. Other attributes for the text sample that correspond to the identified action can then be determined from other portions of the text sample. In some implementations, the classification engine 216 may classify text samples into different domains of knowledge such as restaurants, music, people, movies, or others. The different domains may then be used, for example, to generate respective language models for the domains and to apply an appropriate language model during runtime. For example, the language models may determine that "How old is Brad Pitt" is a much more likely transcription than "How old is $10^{th}$ Street," because text samples in a people domain are more likely to include the phrase "How old is" than text samples in a maps or location domain.

In some implementations, the labels from the annotation engine 218 can be used to generate abstracted text samples. Abstracted text samples are modified text samples that retain the same structure and general word usage of the original text sample, but substitute particular terms in the original text sample with placeholders. For example, as shown in FIG. 2, parsed text samples 214a-e have had certain original terms stripped from the text samples and substituted with a placeholder that identifies a class of the deleted terms. Thus, the original text sample 212 "Call Bob at home" is modified to "Call $name at home." As the original text sample 212 is processed by the semantic parser 204, the annotation engine 218 identifies that the word "Bob" is a name, and thus labels the name accordingly. Similarly, the original text sample 212 "Set alarm for 6:30 AM on Thursdays" can be processed by the semantic parser 204, and the annotation engine 218 can identify that the terms "6:30 AM" and "Thursdays" refer to an alarm time and day of the week, respectively. The semantic parser 204 can then generate a parsed text sample 214c having placeholders substituted for the specific attributes referenced in the original text sample, e.g., "Set alarm for $time on $day(s)."

In some implementations, the abstracted text samples can be generated by another subsystem outside of the semantic parser 204. For example, the semantic parser 204 may generate labeled output along the lines of "<action>Call</action><callee>Bob</callee> at <location>home</location>." The output of the semantic parser 204 may not be abstracted at this stage, but then an abstraction module (not shown) can use the labeled output of the semantic parser 204 to generate abstracted text samples. For example, the abstraction module can use the labeled output for "Call Bob at home" to determine that one of the attributes for the specified action is a name—i.e., that the <callee> attribute represents the name of an entity, and therefore a $name placeholder can be inserted into the abstracted text sample in place of Bob. In some implementations, the abstraction module may be located within the language modeling engine 208.

Parsed text samples 214 may be generated for all, some, or none of the original text samples 212 in some implementations. In some examples, specific terms used in the original text samples that belong to particular classes, such as a specific name or time recited in the original text sample, may not be as relevant to generating a language model 210 as the indication of the class to which the terms belong. Therefore, a language model 210 may retain flexibility to recognize other terms in a class that may not have been explicitly recited in any of the original text samples 212 on which the language model 210 was trained. For example, a language model 210 may be trained in part using a parsed text sample 214b that has been generated from original text sample 212 "How do I get to Caroline's place?" The parsed text sample 214b, "How do I get to $name('s) place?," substitutes the name "Caroline" for the $name placeholder. The language model 210b that is trained using the parsed text sample 214b may more readily recognize similar utterances that use many of the same words and sentence structure as the original text sample 212, but that use a different name (e.g., "How do I get to Bill's place?"). In some implementations, original text samples 212 are used to train the language models 210, and specific terms within a class can be identified and substituted by the language model 210 during runtime.

At stage C (228), the parsed text samples 214 output by the semantic parser 204 are grouped by the actions or other classifications that have been associated with the parsed text samples 214. Based on these groupings, subsets of training samples 206 are generated that include parsed text samples 214 associated with one or more particular actions. In some implementations, each subset of training samples 206 can include only parsed text samples 214 that are associated with one or more particular actions, to the exclusion of other text samples associated with other actions. Thus, each subset of training samples 206 can correspond to one or more particular actions. In some implementations, the subsets of training samples 206 may not be comprised exclusively of text samples associated with the one or more particular actions that correspond to respective ones of the subsets of training samples 206. In these implementations, text samples 214 for one or more particular actions may be overrepresented in the subset as compared to a general, non-action specific collection of text samples in a language. For example, all or some of the parsed text samples 214 associated with a particular action may be grouped and assigned to a particular subset of training samples 206, but the particular subset 206 may also include an underrepresented sampling of other text samples 212 associated with other actions and/or other training data obtained from sources other than one or more corpora 202 and semantic parser 204.

To further illustrate stage C (228), FIG. 2 depicts an example of five different subsets of training samples 206 that are generated from groupings of the parsed text samples 214. The depicted subsets 206 include a Telephone Training Subset 206a, Navigation Training Subset 206b, Alarm Training Subset 206c, Messaging Training Subset 206d, and Home Controls Training Subset 206e. Each of the subsets 206 are depicted as receiving a respective text sample 214 from the semantic parser 204 that has been associated with a respective action corresponding to the subset 206. For example, the text sample 212 "Call Bob at home" is associated with a telephone calling action. A parsed text sample 214a—"Call $name at home"—is generated based on an output of the semantic parser 204. The parsed text sample 214a is associated with the telephone calling action and is therefore assigned to the Telephone Training Set 206a, thereby being grouped with other training samples that are associated with the telephone calling action. Similarly, subsets 206b-e each receives respective parsed text samples 214 that match one or more actions corresponding to respective ones of the subsets 206b-e.

In some implementations, less than all of the parsed text samples 214 may be included in a subset of training samples 206. Some of the parsed text samples 214 may be discarded so as to exclude these text samples 214 from a special training set (subset of training samples) 206. In some implementations, certain ones of the parsed text samples 214 may be discarded from the special training sets 206 due to a low confidence that the discarded text samples 214 are correctly associated with the one or more actions identified by the semantic parser 204. For example, the classification engine 216 may determine that an alarm clock action is most likely associated with a text sample 212 that reads "Jim witnessed events that evening that would alarm him for years." Yet, the parser scorer 220 may assign a relatively low confidence score to the association between the text sample 212 and the alarm clock action since the sentence does not strongly correlate with the usual hallmarks of a sentence that is actually directed to an alarm clock action. In some implementations, parsed text samples 214 whose confidence score is determined to be below a threshold confidence score or that does not otherwise satisfy a predetermined threshold score may be discarded. Discarding parsed text samples 214 with low confidence scores can ensure that the special training sets 206 primarily include only training data that is actually (or most likely) directed to the particular actions that correspond to each of the special training sets 206.

At stage D (230), the special training sets 206 are provided to the language modeling engine 208 to generate special language models 210. The language modeling engine 208 is configured to analyze training data and to generate, based on the training data, a language model that can be used, for example, in speech recognition. The language modeling engine 208 can statistically analyze the structure of, and use of terms in, sentences, phrases, and clauses of text from the special training sets 206. The language modeling engine 208 can assign probabilities that a sequence of two or more terms will occur in a language, or that two or more terms will be used near each other in a language. The probabilities determined by the language modeling engine 208 can then be used by a language model during runtime to process an utterance and to select sequences of terms for a transcription of the utterance that most likely indicate the actual words used by the speaker. Some example operations of a language model 210 are described in greater detail below with respect to FIG. 5. In some implementations, the language modeling engine can determine probabilities that particular terms will appear in sequence with or near a word classifier. For example, the language modeling engine 208 may determine a probability that any name (e.g., as indicated by the $name placeholder in parsed text sample 214a) follows a particular term, rather than or in addition to a probability that a particular name (e.g., Bob) follows the particular term. Thus, a probability may be assigned to the sequence "Call $name," and/or the sequence "Call Bob."

The language modeling engine 208 can generate a special language model 210 for each of the special training sets 206. For example, textual samples from only Telephone Training Subset 206a may be used by the language modeling engine 208 to generate a special Telephone Language Model 210a. Similarly, textual samples from only the Navigation Training Subset 206b may be used in generating a special Navigation Language Model 210b. Parsed text samples 214 that were not associated with particular action(s) corresponding to a particular special training set 206 may not be used by the language modeling engine 208 to generate the special language model 210 for the particular actions(s). Accordingly, each of the special language models 210 can be generated based on training data directed to one or more actions or applications of a computing device. The resulting special language models 210 may therefore be more likely to generate accurate transcriptions of speech utterances, such as voice commands, that are directed to an action on which one of the special language models 210 was trained. For example, a general language model that has been trained on a wide scope of text samples may not recognize that certain words are commonly used together in the context of certain actions. Additionally, the output of language models in speech recognition systems are sometimes provided to a semantic parser. Because the special language models 210 have been trained on data that has been classified by a semantic parser 204, the output of a language model may more likely comport with language that the semantic parser 204 can accurately annotate. In some implementations, the language modeling engine 208 may process parsed text samples 214 from the special training sets 206 serially as they are available, or they may be processed in batch.

In some implementations, the language modeling engine 208 may generate the special language models 208 without building off of existing language models. In some implementations, the language modeling engine 208 may use an existing language model, such as all-purpose language model (general language model) that has been trained with non-action specific data for a language, to generate a special language model 210. For example, a special language model 210 may be generated by biasing the probabilities from the all-purpose language model that particular terms are used in a sequence or near each other in a language. For instance, the all-purpose language model may indicate that the probability of the word "for" following the phrase "alarm" is 0.15, but the probability may be adjusted upwards for the special Telephone Language Model 210a to 0.5 if many samples in the Telephone Training Subset 206a used phrases like "Set alarm for" a time.

Figure 3:
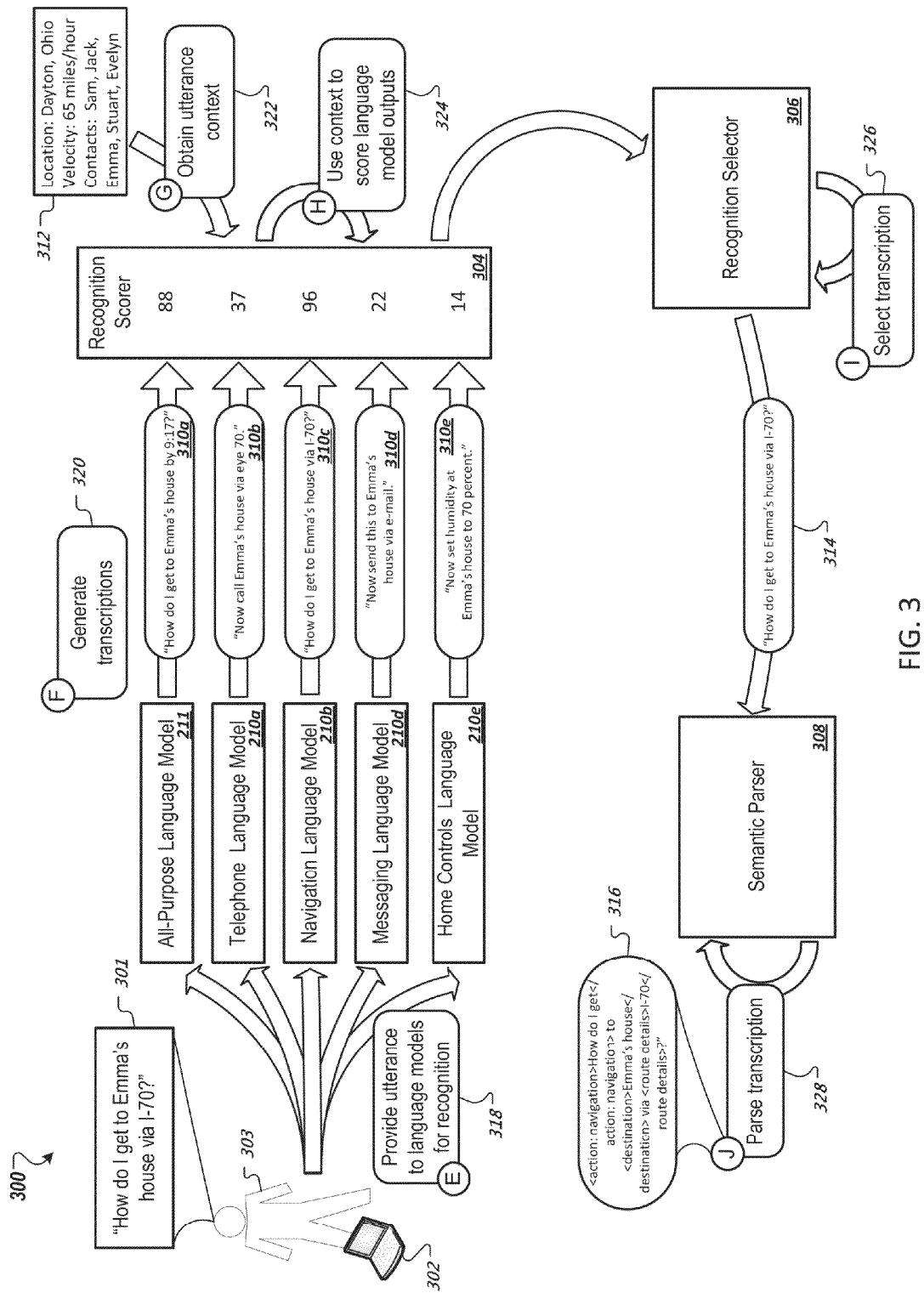
FIG. 3 depicts a schematic diagram of an example system for performing speech recognition using special language models.

With reference to FIG. 3, a schematic diagram is depicted of an example system 300 for performing speech recognition using special language models. The system 300 can be configured to perform a process indicated by stages E-J in the diagram. In some implementations, the system 300 includes one or more of a computing device 302, language models 210, 211, recognition scorer 304, recognition selector 306, and semantic parser 308.

At stage E (318), an utterance 301 or other form of spoken input is provided to one or more language models 210, 211. The utterance 301 may be spoken by a user at a computing device 302. In some implementations, the computing device 302 may be a mobile computing device such as a smartphone, tablet computing device, or wearable computing device such as a smart watch or intelligent glasses. In some implementations, the computing device 302 may be a desktop computer, notebook computer, or an onboard/integrated vehicle electronics system. The computing device 302 may passively monitor an audio stream detected by a microphone operatively coupled to the computing device 302 to detect an utterance, for example, by recognizing a hotword that triggers further action to be performed by the device 302. In some implementations, the user 303 may select a control on the computing device 302 to activate a speech recognition service, but the computing device 302 may not listen for spoken input until the control is selected. The computing device 302 may perform the speech recognition locally on the device 302, or the all or a portion of the utterance 301 may be transmitted over a network (e.g., the Internet) to a remote server for the speech recognition to be performed remotely.

The utterance 301 can be provided to one or more language models 210, 211. The language models 210, 211 may be stored on the computing device 302 for performing local speech recognition, or remotely for performing remote speech recognition. The utterance 301 may be provided to multiple special language models 210 and one or more all-purpose language models 211. The special language models 210 can be generated using training data that is associated with one or more particular actions, as described in FIG. 2. For example, the Telephone Language Model 210a may be specially configured to transcribe utterances 301 relate to calling actions and/or other actions associated with a telephone functionality on a computing device 302. Similarly, the Navigation Language Model 210b may be specially configured to transcribe utterances 301 that pertain to navigation commands, the Messaging Language Model 210d specially configured for transcribing e-mail or other messaging commands, and the Home Controls Language Model 210e specially configured for transcribing smart home commands (e.g., set humidity, turn on lights, etc.). The utterance 301 may also be provided to the all-purpose language model 211, which may be trained on data that represents a language generally rather than being trained exclusively with action-specific data or data that is overrepresented by action-specific text samples in a language.

In some implementations, the utterance 301 can be processed by one or more of the language models 210, 211 in parallel. In some implementations, the utterance 301 may be processed by one or more of the language models 210, 211 serially. The utterance 301 may be processed by all of the language models 210, 211, or, in some examples, the utterance 301 may be processed only until a textual transcription of the utterance 301 from one of the language models 210, 211 is determined to satisfy a recognition confidence threshold, in which case further processing by the language models 210, 211 may cease. For example, the utterance 301, "How do I get to Emma's house via I-70?", may be processed first by the all-purpose language model 211, then by the Telephone Language Model 210a, and then by the Navigation Language Model 210b. The language model 210b may generate a transcription that is entirely accurate for the utterance 301, and that has a recognition confidence score that is sufficiently high to be confident in the output of the Navigation Language Model 210b so that further processing by other special language models 210 is not necessary.

In some implementations, one or more language models 210, 211 may be selected to receive the utterance 301 based on a pre-analysis of audio for the utterance 301. For example, the utterance 301 may begin with a hotword that indicates a particular action to which the utterance is directed. The utterance 301 may thus have a first portion that is a hotword and a second portion that includes additional information related to the hotword. For example, a user may speak a command, "Open a new task to remind me to pick up the birthday cake on Thursday." The first term, "Open," can be a hotword that is recognizable by a hotword detector. The hotword detector may be provided on the computing device 302 or remote from the computing device 302. The hotword dector may have a limited grammar capable of recognizing a relatively small number of terms. The terms that are recognizable by the hotword detector may correspond to particular actions. Thus, when an utterance 301 is received that begins with an action, the hotword detector may recognize the action, and as a result, the utterance 301 is provided to one or more of the special language models 210 that correspond to the action. For example, the term "Open" may be registered by an e-mail application with a voice command service on a computing device 302 so that the results of speech recognition of an utterance 301 including the "Open" command are provided to the e-mail application. Accordingly, because "Open" is associated with a messaging action, when the sentence "Open a new task to remind me to pick up the birthday cake on Thursday" is uttered, the "Open" hotword is detected, and the utterance then provided to the Messaging Language Model 210d.

At stage F (320), speech recognition is performed on the utterance 301 and textual transcriptions 310 of the utterance 301 are generated using one or more of the language models 210, 211. Each of the language models 210, 211 that were provided the utterance 301 may be used individually to generate a respective transcription 310. For example, as shown in FIG. 3, the utterance 301, "How do I get to Emma's house via I-70?", is provided to the all-purpose language model 211, and multiple special language models 210a-e. Each language model generates a respective transcription 310. Depending on the utterance 301 and the configuration of the language models 210, 211, some or all of the language models 210, 211 may generate different transcriptions 310, or may generate equivalent transcriptions 310. In the example of FIG. 3, each of the language models 210, 211 have produced slightly variant transcriptions 310 of the utterance 301. For instance, the all-purpose language model 211 output "How do I get to Emma's house by 9:17?" By contrast, the special Messaging Language Model 210d output "Now send this to Emma's house via e-mail." The output from the all-purpose language model 211 is more accurate than the output from the special Messaging Language Model 210d. Yet, neither of the foregoing language models 210d, 211 produced an entirely accurate transcription 310 of the utterance 301 that was actually spoken. On the other hand, the special Navigation Language Model 210b has produced a completely accurate transcription 310c of "How do I get to Emma's house via I-70?" The accuracy of the transcription 310c may be a result of the subject matter of the utterance 301 matching the subject matter of the special Navigation Language Model 210b—i.e., both relate to navigation. Because the special Navigation Language Model 210b has been specially trained with navigation-related text samples, it is more likely to accurately transcribe a navigation-related utterance 301 than other ones of the special language models 210 or even the all-purpose language mode 211. However, a special language model 210 that has been trained on data for a first action, and is then requested to transcribe an utterance 301 directed to a second action may produce less accurate results than the all-purpose language model 211. For example, the special Home Controls Language Model 210e is shown in FIG. 3 to have produced the least accurate transcription 310e for utterance 301: "Now set humidity at Emma's house to 70 percent."

At stage G (322), the system 300 can obtain information that indicates context 312 for the utterance 301. The context information 312 may be received in conjunction with the utterance 301. The context information 312 can include information about the context of the utterance 301 that is usable to determine which of multiple different transcriptions 310 of the utterance 301 is likely most accurate. The context information 312 may include information about the user 303 who spoke the utterance 301, information about the computing device 302, information from a profile or account of the user 301 (e.g., interests, demographic information, locations, language), location information, information about people or other entities associated with the user 303 (e.g., a contacts list, most frequently or recently called list, social media connections), information about background or environmental noise, information about applications being executed on the computing device 302 when the utterance 301 is submitted for speech recognition, information that identifies an application to which the utterance 301 was provided, additional information, or any combination of these. For example, the context information 312 depicted in FIG. 3 indicates a location and velocity of the computing device 302 when the utterance 301 was provided, along with the names of favorite contacts associated with an account of the user 303. In some implementations, the context information 312 can be anonymized so that personally identifying information is stripped from the information provided to the system 300. The context information 312 may also be deleted as soon as the system 300 is done using it in a particular instance. For example, once the recognition scorer 304 has used the context information 312 to determine a recognition confidence score for a particular utterance 301, the context information 312 can be deleted immediately. Users may also opt-out of or opt into providing context information 312.

At operation H (324), a recognition scorer 304 determines a recognition confidence score for each of the transcriptions 310 that indicates a likelihood that the transcription 310 is accurate. Recognition confidence scores can be determined for one or more of the transcriptions 310. In some implementations, the recognition confidence scores can be determined based on information provided by the language models 210, 211. For example, if the special Telephone Language Model 210a determines that utterance 301 includes sequences of terms that are not commonly used in the context of telephone actions, then the Telephone Language Model 210a may provide an indication to the recognition scorer 304 of relatively low confidence in the transcription 310b.

In some implementations, the recognition scorer 304 may use the context information 312 to generate a recognition confidence score for a transcription 310. The context information 312 can be analyzed to determine whether the context associated with an utterance 301 is consistent with one or more actions associated with special language models 210. If the context information 312 is consistent with an action associated with a special language model 210, then the transcription 310 produced by that special language model 210 may be assigned a relatively higher recognition confidence score. If the context information 312 is inconsistent with an action associated with a special language model 210, then the transcription 310 produced by that special language model 210 may be assigned a relatively lower recognition confidence score. For example, the particular context information 312 shown in FIG. 3 indicates that the computing device 302 was traveling at 65 miles per hour at the time the utterance 301 was submitted to the language models 210, 211. From this information, the recognition scorer 304 can determine that the user is driving or otherwise in a moving vehicle, and is not at home. Accordingly, the context information 312 is inconsistent with actions associated with the special Home Controls Language Model 210e. Therefore, the recognition scorer 304 generates a relatively low recognition confidence score of 14 for the transcription 310e produced by the Home Controls Language Model 210e. But, the context information 312 is consistent with a scenario in which the user is searching for navigation information, and so the special Navigation Language Model 210b is assigned a relatively high recognition confidence score of 96 for its transcription 310c. Indeed, the transcription 310c that is output by the special Navigation Language Model 210b is scored highest among the transcriptions 310 from all of the special language models 210 and all-purpose language model 211. The all-purpose language model 211 still scored relatively high, but its transcription 310a was not entirely accurate and its recognition confidence score was somewhat lower than for the special Navigation Language Model 210b.

At operation I (326), the recognition selector 306 can identify one or more of the transcriptions 310 that were generated by the various language models 310, 311 to use in response to the utterance 301 that was spoken to the computing device 302. In some implementations, the selected transcription may be returned to the computing device and displayed. For example, if the user 303 used speech recognition to type into the computing device 301 in a notes application, then the content of the utterance 301—as indicated by the selected transcription—could be inserted into a note in which the user was typing. In some implementations, the recognition selector 306 can select one or more transcriptions 310 based on their respective recognition confidence scores. The transcriptions 310 with the highest recognition confidence scores are determined to likely be the most accurate transcriptions. For example, the recognition selector 306 may select only transcription 310d from special Language Model 210d as the transcription most responsive to the utterance 301 since it has the highest recognition confidence score.

In some implementations, such as for processing voice commands, the selected transcription(s) 314 can be provided to a semantic parser 308. The semantic parser 308 may perform the same or similar functions as the semantic parser 204 described in FIG. 2. For example, the semantic parser 308 may associate a transcription 314 with an action, identify one or more attributes associated with that action, and annotate or otherwise label various portions of the transcription 314 with particular ones of the attributes. The annotated transcription 316 can then be used, for example, to complete an action requested by the utterance, such as launching a navigation application and generating directions to a destination identified in the transcription 314. The semantic parser 308 may perform these operations at stage J (328). For example, an annotated transcription 316 of "How do I get to Emma's house via I-70?" is shown in box 316 of FIG. 3.

Figure 4:
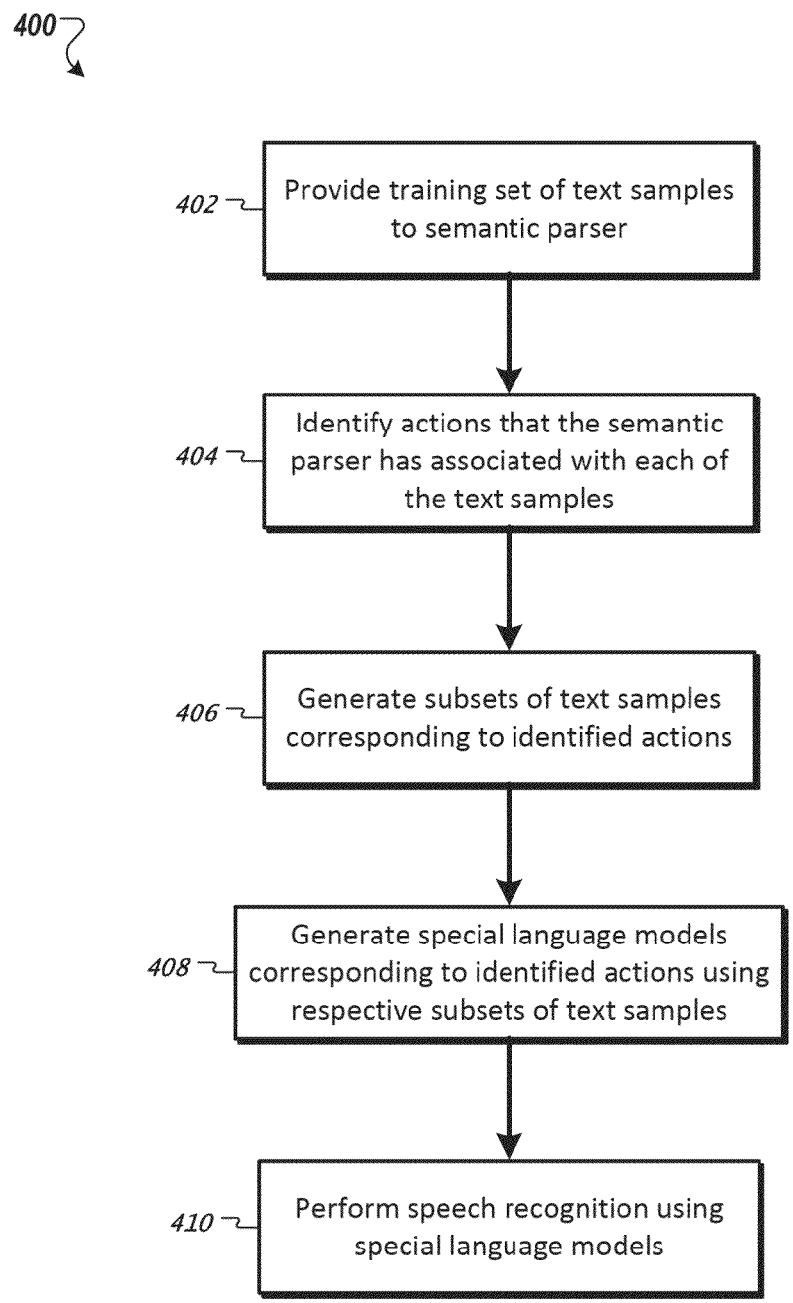
FIG. 4 depicts an example process for training and using special language models for speech recognition.

FIG. 4 depicts an example process 400 for training and using special language models for speech recognition. In some implementations, the process 400 may be carried out by the process 100, system 200, and/or system 300 that are depicted and described with respect to FIGS. 1, 2, and 3, respectively. Generally, the process 400 generates special language models that are trained to recognize speech within a particular category or domain (e.g., directed to a particular action). After one or more special language models are generated, the special language models can be used to transcribe an utterance spoken by a user.

At operation 402, a set of text samples can be provided to a semantic parser. The text samples can be obtained from one or more sources and can be identified from one or more corpora of data. For example, at least some of the text samples may represent search queries that have been submitted to a search engine. Some of the text samples may represent utterances that users have provided to a computing device and that have been previously been transcribed. Some text samples may be obtained from the content of web sites and other electronic content located on a network. In some implementations, the text samples may be representative of how terms are used in a language to construct phrases, clauses, and sentences. In some implementations, the text samples may be directed to one or more actions.

At operation 404, a semantic parser analyzes all or particular ones of the text samples to generate a parsed text sample. The parsed text sample may be annotated or otherwise labeled to identify one or more actions (or other domains or categories) that are determined to be associated with the text sample, and to identify portions of the text sample that indicate values for one or more attributes. In some implementations, the annotated attributes in a text sample may depend on the action associated with the text sample. For example, the semantic parser may determine that the text sample "Set alarm for 6:30 AM" is associated with an alarm clock action. Accordingly, a set of attributes may be identified and made available for annotations for the text sample, such as an alarm time and day of the week indicator. On the other hand, a text sample that has been associated with an e-mail action may be annotated with attributes such as recipient, subject line, message body, and signature.

Using output from the semantic parser, at operation 406, subsets of text samples are generated. Each of the subsets can be comprised of text samples that the semantic parser has associated one or more particular actions. For example, all or some of the text samples that are associated with a navigation action may be grouped to form a special navigation subset. Additional subsets may be formed of text samples associated with other respective actions.

At operation 408, one or more special language models are generated by training each of the special language models with a respective subset of text samples. For example, a first special language model may be generated that relates to navigation by using only text samples with the navigation subset of text samples to train the language model, or by using an over-representative proportion of navigation-related text samples as compared to a general language set of text samples that proportionally reflects the frequency with which multiple different actions are used in a language as a whole. The special language models may be adapted to more accurately transcribe utterances directed to an action that matches an action associated with text samples on which the special language model was trained.

At operation 410, speech recognition can be performed using the special language models. For example, a user may utter a voice command to his smartphone or other computing device. The utterance can be submitted to one or more special language models, and an all-purpose language model in some implementations. Each of the language models can transcribe the utterance, and the utterance that is most accurate can be identified, for example, to return to the computing device for display to the user or can be provided to a semantic parser.

Figure 5:
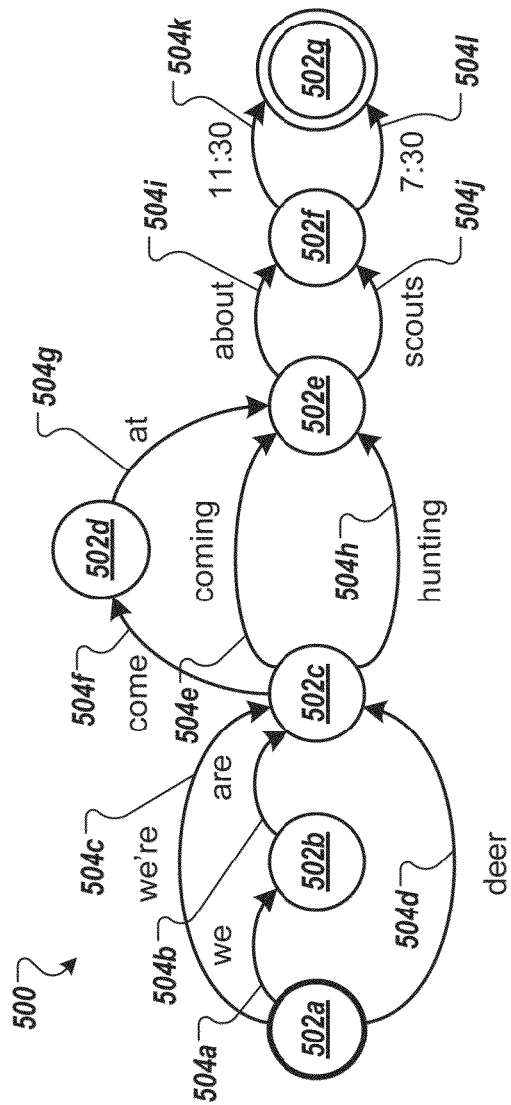
FIG. 5 depicts an example of a word lattice representative of a language model that can be used for transcribing one or more words or other terms from spoken input.

In some implementations, the operations of a language model can be represented by a word lattice, as shown in FIG. 5. FIG. 5 depicts an example of a word lattice 500 used for transcribing one or more words or other terms from spoken input. The word lattice 500 is represented here as a finite state transducer. The word lattice 500 includes one or more nodes 502a-g that correspond to the possible boundaries between words. The word lattice 500 includes multiple edges 504a-l for the possible words in several transcription hypotheses that result from the word lattice 500. In addition, each of the edges 504a-l can have one or more weights or probabilities of that edge being the correct edge from the corresponding node. The weights are determined by the language model and can be based on, for example, a confidence in the match between speech data for an utterance and the word for that edge and how well the word fits grammatically and/or lexically with other words in the word lattice 500.

For example, initially, the most probable path through the word lattice 500 may include the edges 504c, 504e, 504i, and 504k, which have the text "we're coming about 11:30." A second best path may include the edges 504d, 504h, 504j, and 504l, which have the text "deer hunting scouts 7:30."

Each pair of nodes may have one or more paths corresponding to the alternate words in the various transcription hypotheses. For example, the initial most probable path between the node pair beginning at the node 502a and ending at the node 502c is the edge 504c "we're." This path has alternate paths that include the edges 504a-b "we are" and the edge 504d "deer." Accordingly, the edge 504e "coming" has alternate words that include the edges 504f-g "come at" and the edge 504h "hunting." The edge 504i "about" has an alternate word that includes the edge 504j "scouts" and the edge 504k "11:30" has an alternate word that includes the edge 504l "7:30." In this manner, the word lattice 500 can thus be used in determining one or more transcription hypotheses for spoken input. A score can be associated with each path through the word lattice 500 that represents a confidence of each transcription hypothesis. The highest scored hypothesis may be an output of the language model.

Figure 6:
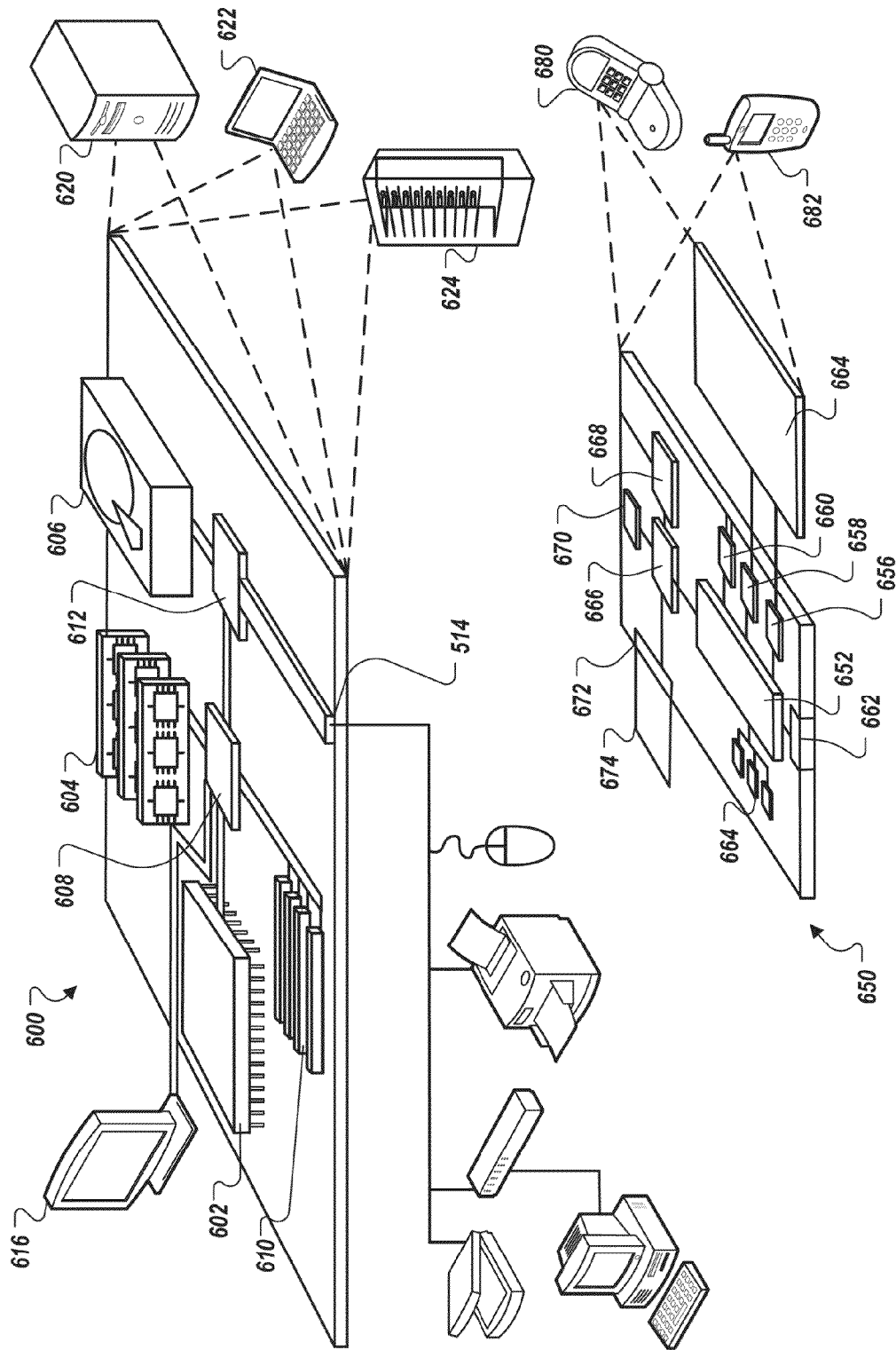
FIG. 6 depicts an example of a computing device and a mobile computing device that can be used to implement the techniques described herein.

FIG. 6 shows an example of a computing device 600 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   providing a training set of text samples to a semantic parser that associates text samples with domains;
   obtaining data that indicates associations determined by the semantic parser between at least some of the text samples of the training set and one or more domains;
   generating a first subset of text samples that the semantic parser has associated with a first of the one or more domains;
   generating a first language model for the first of the one or more domains using the first subset of text samples that the semantic parser has associated with the first of the one or more domains; and
   performing speech recognition on an utterance using the first language model for the first of the one or more domains.

2. The computer-implemented method of claim 1, wherein the text samples in the training set are identified from at least one of records of past search queries, web pages, books, periodicals, and other electronic documents.

3. The computer-implemented method of claim 1, wherein at least some of the text samples in the training set are identified from records of past utterances spoken by a population of users.

4. The computer-implemented method of claim 1, wherein performing speech recognition on the utterance further comprises using, along with the first language model for the first of the one or more domains, a general language model that is not associated with particular domains.

5. The computer-implemented method of claim 1, further comprising:
   generating a second subset of text samples that the semantic parser has associated with a second of the one or more domains; and
   generating a second language model for the second of the one or more domains using the second subset of text samples that the semantic parser has associated with the second of the one or more domains.

6. The computer-implemented method of claim 5, wherein performing speech recognition on the utterance further comprises using the second language model for the second of the one or more domains.

7. The computer-implemented method of claim 6, wherein performing speech recognition on the utterance comprises:
   obtaining a first transcription of the utterance from the first language model and a second transcription of the utterance from the second language model;
   obtaining respective scores for the first transcription and the second transcription that indicate respective likelihoods that the first transcription or the second transcription accurately reflects the utterance; and
   selecting the first transcription or the second transcription to provide to a user based at least on the respective scores for the first transcription and the second transcription.

8. The computer-implemented method of claim 7, further comprising identifying context information associated with the utterance, and using the context information to bias the respective scores for the transcriptions.

9. The computer-implemented method of claim 8, wherein using the context information to bias the respective scores for the transcriptions comprises determining whether the context information is consistent with the first of the one or more domains or the second of the one or more domains.

10. The computer-implemented method of claim 1, further comprising obtaining, for particular ones of the text samples of the training set, a confidence score that indicates a confidence of the association between the text sample and the one or more domains that the semantic parser has associated with the text sample.

11. The computer-implemented method of claim 10, further comprising identifying data that indicates user confirmation of the one or more domains that the semantic parser has associated with a particular one of the text samples, and in response, biasing the confidence score for the particular one of the text samples to indicate a greater confidence in the association between the particular one of the text samples and the one or more domains.

12. The computer-implemented method of claim 10, wherein generating the first subset of text samples that the semantic parser has associated with the first of the one or more domains comprises excluding text samples from the first subset of the text samples that have confidence scores below a predetermined threshold.

13. The computer-implemented method of claim 1, wherein generating the first language model for the first of the one or more domains comprises identifying terms in the text samples that are associated with a class, and wherein performing speech recognition on the utterance using the first language model comprises accessing lists of terms associated with the class.

14. The computer-implemented method of claim 1, wherein the one or more domains are one or more actions that a user may request or command to be executed.

15. The computer-implemented method of claim 1, wherein performing speech recognition on the utterance comprises using the first language model to determine a likelihood of occurrence in a natural language of a sequence of terms in a candidate transcription of at least a portion of the utterance.

16. One or more computer-readable storage devices having instructions stored thereon that, when executed by one or more computers, cause the one or more computers to perform operations comprising:
   providing a training set of text samples to a semantic parser that associates text samples with domains;
   obtaining data that indicates associations determined by the semantic parser between at least some of the text samples of the training set and one or more domains;
   generating a first subset of text samples that the semantic parser has associated with a first of the one or more domains;
   generating a first language model for the first of the one or more domains using the first subset of text samples that the semantic parser has associated with the first of the one or more domains; and
   performing speech recognition on an utterance using the first language model for the first of the one or more domains.

17. The one or more computer-readable storage devices of claim 16, wherein the text samples in the training set are identified from at least one of records of past search queries, web pages, books, periodicals, and other electronic documents.

18. The one or more computer-readable storage devices of claim 16, wherein at least some of the text samples in the training set are identified from records of past utterances spoken by a population of users.

19. The one or more computer-readable storage devices of claim 16, wherein performing speech recognition on the utterance further comprises using, along with the first language model for the first of the one or more domains, a general language model that is not associated with particular domains.

20. The one or more computer-readable storage devices of claim 16, wherein the operations further comprise:
   generating a second subset of text samples that the semantic parser has associated with a second of the one or more domains; and
   generating a second language model for the second of the one or more domains using the second subset of text samples that the semantic parser has associated with the second of the one or more domains.

21. A system comprising:
   a repository of training data stored on one or more computers, the training data including a plurality of text samples in a natural language;
   a semantic parser, on the one or more computers, configured to process a set of text samples from the plurality of text samples to determine, for each text sample in the set of text samples, a domain associated with the text sample;
   a training set manager, on the one or more computers, configured to generate subsets of text samples that correspond to respective domains, wherein each subset of text samples includes text samples that the semantic parser has associated with the domain that corresponds to the subset of text samples;
   a language modeling engine, on the one or more computers, configured to generate a respective language model for each of the subsets of text samples; and
   a speech recognizer, on the one or more computers, configured to receive an utterance and to recognize the utterance using one or more of the language models that are generated for each of the subsets of text samples.

* * * * *